United States Patent [19]

Hibi

[11] Patent Number: 4,520,397
[45] Date of Patent: May 28, 1985

[54] AUTO BRIGHTNESS LIMITER CIRCUIT FOR TELEVISION

[75] Inventor: Hitoshi Hibi, Yaita, Japan

[73] Assignee: Sharp Kabushiki Kaisha, Osaka, Japan

[21] Appl. No.: 450,475

[22] Filed: Dec. 16, 1982

[30] Foreign Application Priority Data

Nov. 11, 1982 [JP] Japan ................................ 57-198420

[51] Int. Cl.³ .......................... H04N 5/14; H04N 5/68
[52] U.S. Cl. .................................... 358/168; 358/243; 358/147
[58] Field of Search ................ 358/168, 183, 243, 30, 358/147, 192.1

[56] References Cited

U.S. PATENT DOCUMENTS 4,253,110  2/1981  Harwood et al. .................... 358/168

Primary Examiner—John C. Martin
Assistant Examiner—Michael D. Parker
Attorney, Agent, or Firm—Birch, Steward, Kolasch & Birch

[57] ABSTRACT

An automatic brightness limiter circuit is disclosed in which a separate digital signal display from a personal computer is superimposed on a television broadcast screen and displayed simultaneously with a video broadcast signal. The beam current of the cathode ray tube is detected and if found to exceed a prescribed value, feedback is applied only to the video amplifier circuit amplifying the video signal. Feedback is not applied to the amplifier circuit of the digital signal display. The amplifier of this digital signal display is arranged so that independent limiting action is carried out corresponding to the amplitude of the digital signal.

1 Claim, 2 Drawing Figures

AUTO BRIGHTNESS LIMITER CIRCUIT FOR TELEVISION

BACKGROUND OF THE INVENTION

This invention relates to an automatic brightness limiter circuit (ABL) for television sets and offers a highly suitable ABL circuit for connecting a personal computer to the television set and superimposing data from the personal computer onto the screen of the television set and displaying both simultaneously.

It is well known that, in normal color television sets, the upper limit of the beam current in the cathode ray tube is held to a certain value using an ABL circuit for the purpose of protection against damaging the horizontal output transistor and the horizontal output transformer due to high beam current.

When displaying television broadcasts and data displays of digital signals from a personal computer simultaneously, the signals composing the computer display are discontinuous "1" or "0" digital signals whereas the TV display is composed of picture signals which change continuously according to time, excluding blanking periods. It is desirable in composite displays formed of these two signals that the TV picture signals be erased or the contrast lowered for ease of viewing during the period that the digital signals exist; the television broadcast pictures in the composite display thereby forming a data background display for the digital signals.

In a television set receiving the foregoing composite display, the beam current $I_K$ of the cathode ray tube will be the sum of the broadcast display component $I_L$ and display component $I_D$ of the digital signal. In other words, it may be expressed as follows.

$$I_K = I_L + I_D$$

Here, if we feed back the detected beam current value $I_K$ to the brightness control circuits of both the broadcast display and the digital signal display as in conventional ABL circuits, it may be expressed by the following.

$$I_L = f(I_K)$$

$$I_D = g(I_K)$$

Components $I_L$ and $I_D$ vary as functions of the overall beam current $I_K$. That is, as the contrast, or brightness (as the digital signals are composed of values of "1" or "0", contrast and brightness will be the same), changes according to the broadcast display forming the background, the display will become difficult to view, the characters of the digital signal display being particularly difficult to read especially when the brightness of the broadcast display changes greatly or when it changes rapidly timewise.

OBJECT AND SUMMARY OF THE INVENTION

This invention has taken these points into consideration and is a device in which ABL action is carried out by feeding back the detected value of the beam current to the brightness control circuit of the broadcast display. ABL operation is prevented even though the brightness of the background broadcast display changes in relation to the digital signal display. This invention simulates ABL operation for independent control of the brightness of the digital signal display.

Other objects and scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

This is an automatic brightness limiter circuit for television sets in which a digital signal display is superimposed on a broadcast display and both are projected onto the CRT screen simultaneously. This circuit is composed of means for video amplification of the picture signals of the broadcast display, means for pulse amplification to amplify the digital signals, means for amplitude limitation to limit the amplitude of the digital signals, means for signal mixing to mix the video signals amplified in the aforementioned video amplifier and the digital signal on which amplitude limitation was carried out in the previous amplitude limiting unit, means for supplying the mixed signal obtained in the signal mixer to the CRT, means for ABL detection that causes ABL output when the CRT beam current is detected and the current is found to exceed a set value, and means for controlling the gain of the aforementioned video amplifier circuit based on this ABL output.

BRIEF DESCRIPTION OF THE INVENTION

The present invention will be better understood from the detailed description given hereinbelow and the accompanying drawings which are given by way of illustration only, and thus are not limitative of the present invention and wherein.

DETAILED DESCRIPTION OF THE INVENTION

Figure 1:
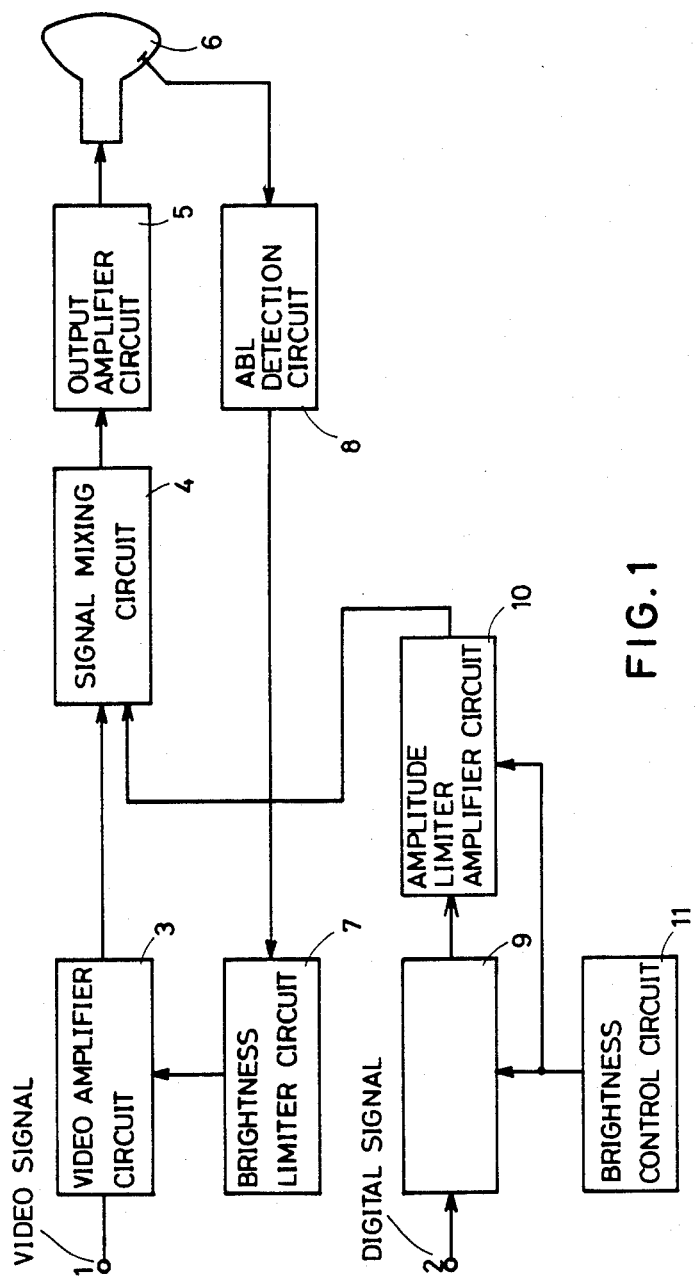
FIG. 1 is a block diagram of an embodiment of the invention.

This invention will now be explained according to the example of operation shown in the diagram below. FIG. 1 is one example of this invention and the video signals received from normal broadcasts are supplied to input terminal 1 and the digital signals from a personal computer are supplied to input terminal 2. The video signals supplied to input terminal 1 are supplied to video amplifier circuit 3 where they are amplified and then fed to signal mixing circuit 4. The strength of the video signal is controlled in video amplifier circuit 3 by brightness control circuit 7 which controls amplifier gain. The digital signals supplied to input terminal 2 are amplified and their amplitude limited by a pulse amplifier circuit 9 and the amplitude limiter amplifier circuit 10 respectively, and are then fed to signal mixing circuit 4. In this instance, the amplifier gain of both amplifier circuits 9 and 10 is controlled by brightness control circuit 11 and amplitude limiting is carried out in amplitude limiter circuit 10 to prevent the amplitude of the digital signal from exceeding a specified value.

The video signal and digital signal are next mixed in signal mixing circuit 4. As the value "1" of the digital signal is, however, normally greater than the peak value of the video signal in this case, the digital signal is output in place of the video signal only during the period that this digital signal output "1" exists. The mixed signal obtained from mixing circuit 4 in this manner is supplied to output amplifier circuit 5 and after being amplified here is fed to cathode ray tube 6. As a result, the television broadcast received will be displayed as the background and the characters and graphics that are the data from the personal computer will be displayed superimposed on this background.

If the video signal or digital signal supplied to cathode ray tube 6 increases for some reason such as when adjusting brightness, and the average beam current of cathode ray tube 6 exceeds a prescribed value, this will be detected by ABL detection circuit 8 and the brightness control circuit is controlled based on this detected output. The gain of video amplifier circuit 3 drops at this time and the brightness of the display on the cathode ray tube, particularly the background display, is controlled. Furthermore, the brightness of the characters and graphics displayed on the screen by the digital signal remains constant even in this case and will change only by adjustment of brightness control circuit 11. However, even if attempts are made to develop an unlimited increase in brightness by adjusting brightness control circuit 11, the limiting action of amplitude limiter circuit 10 prevents the brightness value from increasing beyond a prescribed value.

Figure 2:
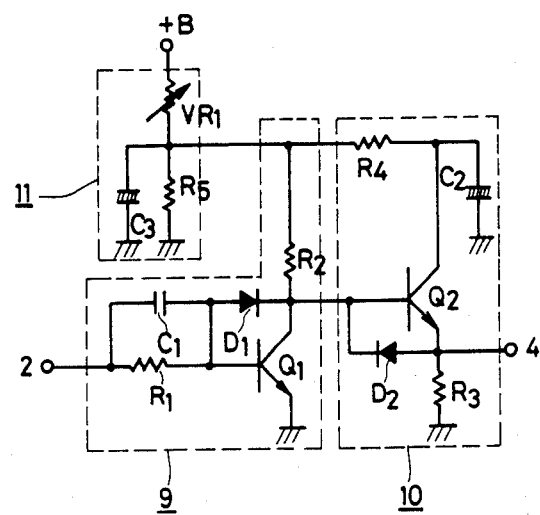
FIG. 2 is a detailed circuit diagram of the essential portion of the embodiment of the invention.

FIG. 2 shows an example of a more detailed circuit of the above operating example composed of pulse amplifier circuit 9, amplitude limiter circuit 10, and brightness control circuit 11. Here, pulse amplifier circuit 9 is composed of transistor $Q_1$, resistors $R_1$ and $R_2$, capacitor $C_1$ and diode $D_1$. Amplitude limiter circuit 10 is composed of transistor $Q_2$, diode $D_2$, resistor $R_3$ and capacitor $C_2$. The digital signal supplied to input terminal 2 is pulse amplified in pulse amplifier circuit 9 and is taken out from the collector of transistor $Q_1$ and is fed to the base of transistor $Q_2$ of amplitude limiter amplifier circuit 10. If the amplitude of the digital signal fed to the base of transistor $Q_2$ is high and its pulse width also wide, the collector voltage will drop due to the voltage drop across resistor $R_4$ resulting from the increase in collector current of transistor $Q_2$ and as a result, the amplitude of the digital signal taken from the emitter of transistor $Q_2$ will be controlled.

Brightness control circuit 11 is composed of resistor $R_5$, capacitor $C_3$ and brightness adjusting variable resistor $VR_1$. The drive voltage supplied to pulse amplifier circuit 9 and amplitude limiter amplifier circuit 10 is varied by variable control of variable resistor $VR_1$ and this varies the amplifier gain of amplifier circuits 9 and 10 and controls the amplitude of the digital signal taken from amplitude limiter circuit 10 which, in effect, changes the brightness of the characters and graphics displayed on the screen.

The invention being thus described, it will be obvious that the same may be varied in many ways. Such variations are not regarded as a departure from the spirit and scope of the invention and all such modifications are intended to be included within the scope of the following claims.

What is claimed is:

1. An automatic brightness limiter circuit for use in a television receiver in which simultaneous display of broadcast signals and superimposed separate digital signals is made on a cathode ray tube comprising:
   means for amplifying the broadcast signals supplied to said television receiver;
   means for pulse amplifying the digital signals supplied to said television receiver;
   means for amplitude limiting said digital signals;
   means for mixing the broadcast signals amplified by the aforementioned means for amplifying broadcast signals and the digital signals amplitude limited by said means for amplitude limiting to develop a mixed signal;
   means for supplying the cathode ray tube with the mixed signal obtained from said means for mixing to develop beam currents;
   means for developing an automatic brightness limiter output when beam currents of said cathode ray tube exceed a prescribed value; and
   means for controlling amplifier gain of said means for amplifying the video signals in response to said automatic brightness limiter output.

* * * * *